United States Patent [19]
Kaaden

[11] Patent Number: 4,781,570
[45] Date of Patent: Nov. 1, 1988

[54] APPARATUS FOR THE MANUFACTURE OF PLASTIC PARTS BY INJECTION MOLDING OR REACTION INJECTION MOLDING

[76] Inventor: Hans-Heinrich Kaaden, Friedrich-Herschel-Strasse 5, 8000 Munich 80, Fed. Rep. of Germany

[21] Appl. No.: 909,836

[22] Filed: Sep. 19, 1986

Related U.S. Application Data

[63] Continuation-in-part of Ser. No. 865,197, Apr. 1, 1986.

[30] Foreign Application Priority Data

Sep. 26, 1985 [DE] Fed. Rep. of Germany ....... 3534254

[51] Int. Cl.$^4$ ................................................ A23P 1/00
[52] U.S. Cl. .................................... 425/547; 425/584; 425/589
[58] Field of Search .............. 425/4 R, 453, 450.1, 425/451.9, 547, 549, 567–569, 574, 575, 588, 589, 594, 595

[56] References Cited

U.S. PATENT DOCUMENTS

| | | | |
|---|---|---|---|
| 3,859,023 | 1/1975 | Pasch | 425/547 |
| 4,275,539 | 6/1981 | Abbott | 425/4 R X |
| 4,360,335 | 11/1982 | West | 425/450.1 |

*Primary Examiner*—Charles Hart

[57] ABSTRACT

There is provided an injection molding machine for the manufacture of plastic parts from thermoplastic, thermoset and/or elastomer material by injection molding or reaction injection molding. The machine includes a multi-station locking unit of horizontal or vertical configuration designed to hold a number of molds and an injection unit associated therewith for the simultaneous injection of the molds. The machine also includes two outer mold clamping plates, one of which is mounted on guide elements and movable thereon in the locking direction and a center mold-receiving part movably mounted on guide elements between the two mold clamping plates and having a heatable melt conduction system with sprue nozzles and one half of a mold attached to each of its sides. The center mold-receiving part is designed as a mold clamping plate sectioned lengthwise relative to the locking direction for receiving larger halves of a mold, the two parts of the plate being kept together by a high-speed clamping device and having the melt conduction system mounted between each other. Separate driving cylinders are attached to the center mold clamping plate. The melt conduction system has one or a plurality of separate melt conduction rails, each of which is rigidly clamped at its face side lengthwise relative to the direction of flow between the sectioned mold clamping plate so that uniform injecftion of both molds is assured regardless of expansion of the melt conduction system during heating.

26 Claims, 1 Drawing Sheet

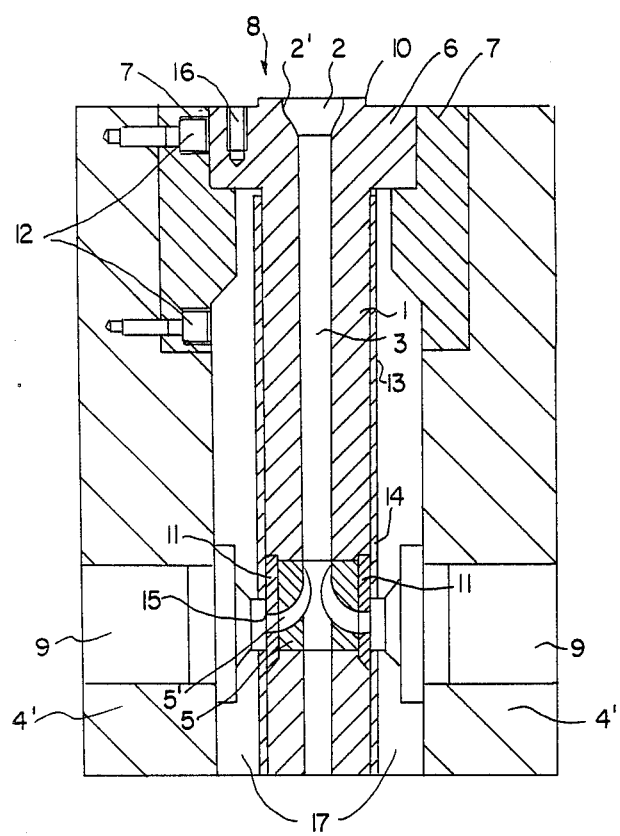

APPARATUS FOR THE MANUFACTURE OF PLASTIC PARTS BY INJECTION MOLDING OR REACTION INJECTION MOLDING

This is a continuation in part of U.S. Ser. No. 865,197, filed Apr. 1, 1986.

The present invention relates to an apparatus for the manufacture of plastic parts from thermoplastic, thermoset and/or elastomer material by injection molding or reaction injection molding. Such an apparatus includes a multi-station locking unit of horizontal or vertical configuration for receiving a number of molds and an associated injection unit for the simultaneous injection of the molds. The apparatus further includes two outer mold clamping plates, of which one plate is mounted on guide elements and movable thereon in the locking direction, and a center mold-receiving part movably mounted on guide elements between the two mold clamping plates and having a heatable melt conduction system with sprue nozzles and one half of a mold attached to each of its two sides. The center mold-receiving part is designed as a mold clamping plate divided lengthwise to the locking direction for receiving larger halves of a mold, the two parts of the plate being kept together by a high-speed clamping device and having the melt conduction system mounted between the two plate parts. Separate driving cylinders are attached to the center mold clamping plate for driving the two parts.

The injection molding machine described above is disclosed in my earlier filed application, U.S. Ser. No. 865,197, the disclosure of which is herein incorporated by reference, and permits a very economical manufacture of larger parts, in particular automobile body parts made of plastic by injection molding or reaction injection molding. By releasing the high-speed clamping device, both parts of the sectioned center mold clamping plate can be displaced sideways, each with one half of the mold, which completely exposes the melt conduction system and renders the latter accessible on both sides.

During feeding of the melt, considerable expansion occurs in the heated melt conduction system.

The object of the present invention is to provide an injection molding machine as described above having a melt conduction system wherein rapid, uniform and simultaneous injection of both molds is assured with any shape of mold in spite of the expansion of the melt conduction system caused by heating.

The above object is accomplished according to the present invention by providing a melt conduction system that has one or several separate melt conduction rails each of which is rigidly clamped at its face side between the divided mold clamping plate lengthwise relative to the direction of flow of the melt. Preferably, each melt conduction rail is designed as one piece and has a central melt conduit.

According to another feature of the invention, the melt conduction rail has an outer flange on each of its two face sides and a guide coupling supported in the sectioned mold clamping plate is associated with each flange and advantageously extends across the width of the sectioned mold clamping plate. Appropriately, a median centering collar adapted to hold the nozzle system is mounted on the face side of the melt conduction rail, and the melt conduit of the melt conduction rail has a widened melt inlet, which may have rounded walls.

The design according to the present invention provides for the possibility of mounting the melt conduction rails of the melt conduction system for feeding the melt at any desired point of the sectioned mold clamping plate, whereby a unilateral expansion is preconditioned by fixing the face side of the melt conduction rail. In this connection, the design according to the invention ensures that the pressure plate is slidably guided with its outer side on the contact surface of the nozzles, so that the contact surfaces of the sprue nozzles and the bores of the pressure plate are centrally supported relative to each other in each case. An expansion of the melt conduction rail away from the sectioned mold clamping plate is prevented because the nozzle system is placed on the melt inlet.

Other objects and features of the present invention will become apparent from the following detailed description considered in connection with the accompanying drawing. It is to be understood, however, that the drawing is designed as an illustration only and not as a definition of the limits of the invention.

The drawing is a vertical cross-sectional view through part of a melt conduction rail according to the present invention.

Melt conduction rail 1 shown in the drawing has a central melt conduit 3 and is designed as one piece. At its face side, melt conduction rail 1 has an outer flange 6 on both sides. A guide coupling 7 supported in the sectioned center mold clamping plate 4' is associated with each of said flanges, whereby the outer boundaries of the flanges 6 are approximately flush with the inner boundaries of the sectioned center mold clamping plate 4'. This design results in intermediate space 17 shown in the figure between mold clamping plate 4' and melt conduction rail 1. Because melt conduction rail 1 is rigidly clamped to flanges 6 at its face side between center mold clamping plate 4' via guide couplings 7, a fixed point is established from which melt conduction rail 1 can only expand to one side due to heating. The fact that melt conduction rail 1 is rigidly connected at its face side with the nozzle system contributes to such unilateral expansion and excludes any expansion of melt conduction rail 1 in the opposite direction, that is, away from the mold clamping plate.

Melt conduction rail 1 with its opposing melt distributors 5 is dimensioned in such a way that taking into account expansion that is expected due to heating under operating conditions, it is assured that contact surfaces 14 of sprue nozzles 9 and bores 15 of pressure plates 11, which are arranged on the outer side of melt distributors 5, are supported centrally relative to each other in each case even if several pairs of melt distributors 5 are mounted one on top of the other. Contact surfaces 14 of sprue nozzles 9 can be closely pressed against pressure plates 11 of melt distributors 5.

In this embodiment, pressure plates 11 are disposed flush with the outer side of melt conduction rail 1. Bore 15, which is present in each pressure plate 11, has a diameter which conforms to the end diameter of melt conduit 5' in melt distributor 5. Melt conduit 5' is curved in the direction of flow, which assures a low-friction, smooth flow of the melt.

Guide couplings 7 extend across the width of divided mold clamping plate 4' and are connected with the latter by means of screws 12. This permits a coupling position of individual conduction rails 1 at any point within mold clamping plate 4'.

For the uptake of the nozzle system, a median centering collar 10 is arranged on the face side of each melt conduction rail 1. Melt conduit 3 of melt conduction rail 1 has a widened melt inlet 2 with rounded side walls 2'. The nozzle system is driven into this widened melt inlet 2. Reference numeral 16 denotes a threaded bore on the face side of melt conduction rail 1, which serves to connect the bore with the nozzle system.

A band heater 13 is mounted on the outer surfaces of the melt conduction rail 1, which can be separately heated and adjusted to the appropriate operating temperature. Band heater 13 is interrupted in the neighborhood of nozzle contact surfaces 14 so as to assure a trouble-free vertical movement of melt conduction rail 1. When the latter expands, pressure plates 11 side on the nozzle contact surfaces 14 with their outer sides. Arrow 8 indicates the direction of flow of the melt.

The nozzle system placed on the melt inlet, which system is appropriately fastened and locked on sectioned mold clamping plate 4' via a high-speed clamping device, remains rigidly connected with the mold clamping plate under any operating conditions and prevents expansion of melt conduction duct 1 away from mold clamping plate 4'.

While only a single embodiment of the present invention has been shown and described, it will be obvious that many changes and modifications may be made thereunto without departing from the spirit and scope of the invention.

What is claimed is:

1. In an apparatus for the manufacture of plastic parts from thermoplastic, thermoset and/or elastomer material by injection molding or reaction injection molding, said apparatus having a multi-station locking unit of horizontal or vertical configuration adapted to hold a number of molds, an injection unit associated therewith for the simultaneous injection of the molds, two outer mold clamping plates, one of which is mounted on guide elements and movable thereon in the locking direction, a center mold-receiving part movably mounted on guide elements between the two mold clamping plates and having a heatable melt conduction system with sprue nozzles and one half of a mold attached to each of its sides, the center mold-receiving part being adapted as a mold clamping plate sectioned lengthwise relative to the locking direction for receiving larger halves of a mold, the two parts of the plate being kept together by a high-speed clamping device and having a melt conduction system mounted between the parts, and separate driving cylinders attached to the center mold clamping plate, the improvement comprising:

said melt conduction system having at least one melt conduction rail, each said at least one melt conduction rail being rigidly clamped at its face side lengthwise relative to the direction of flow between the sectioned mold clamping plate.

2. The apparatus according to claim 1, comprising a plurality of separate melt conduction rails.

3. The apparatus according to claim 1, wherein each of said at least one melt conduction rails is designed as one piece.

4. The apparatus according to claim 1, wherein each of said at least one melt conduction rails has a central melt conduit.

5. The apparatus according to claim 1, wherein counter opposed melt distributors are mounted in said at least one melt conduction rail.

6. The apparatus according to claim 5, wherein at least two pairs of melt distributors are mounted.

7. The apparatus according to claim 1, wherein each of said at least one melt conduction rails has an outer flange on each of its two face sides, each of said flanges being associated with a guide coupling supported in the sectioned mold clamping plate.

8. The apparatus according to claim 7, wherein said guide couplings extend across the width of the sectioned mold clamping plate and are connected thereto.

9. The apparatus according to claim 7, wherein the outer boundaries of said flanges are approximately aligned with the inner boundaries of the sectioned mold clamping plate.

10. The apparatus according to claim 9, which further comprises a median centering collar arranged on the face side of the melt conduction rail for receiving the nozzle system.

11. The apparatus according to claim 4, wherein said melt conduit of the said at least one melt conduction rail has a widened melt inlet.

12. The apparatus according to claim 11, wherein said melt inlet has rounded side walls.

13. The apparatus according to claim 1, which further comprises threaded bores arranged on the face side of the melt conduction rail for connecting the latter with the nozzle system.

14. The apparatus according to claim 1, wherein each said at least one melt conduction rail is rigidly connectable with the nozzle system on its face side.

15. The apparatus according to claim 1, wherein said nozzle system is fastened and locked on the sectioned mold clamping plate via a high-speed clamping device.

16. The apparatus according to claim 1, wherein a band heater is mounted on the outer surfaces of each said at least one melt conduction rail.

17. The apparatus according to claim 16, wherein each band heater may be separately heated and adjusted to the appropriate operating temperature.

18. The apparatus according to claim 5, wherein a curved, in the direction of flow, melt feeding conduit leading to the sprue nozzles is arranged in each melt distributor.

19. The apparatus according to claim 18, wherein a pressure plate is arranged on the outer side of each melt distributor.

20. The apparatus according to claim 19, wherein said pressure plate extends flush with the outer side of the at least one melt conduction rail.

21. The apparatus according to claim 20, wherein said pressure plate has a bore with a diameter matching the end diameter of said curved melt feeding conduit of the melt distributor.

22. The apparatus according to claim 5, wherein the contact surfaces of the sprue nozzles can be closely pressed against the pressure plates of the melt distributors.

23. The apparatus according to claim 16, wherein said band heater is interrupted in the neighborhood of the contact surfaces of the nozzles.

24. The apparatus according to claim 22, wherein the outer side of the pressure plate is slidably guided on the contact surface of the nozzle.

25. The apparatus according to claim 1, wherein guides are arranged on the inner side walls of the sectioned mold clamping plate, in which the melt conduction rail is height adjustable.

26. The apparatus according to claim 1, wherein a separate screw unit is associated with each melt conduction rail.

* * * * *